Figure 1:
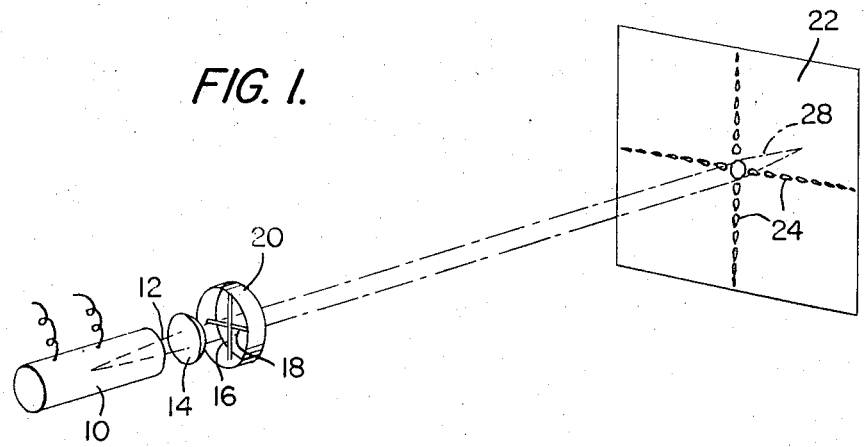

United States Patent [19]
Eggenschwyler

[11] 3,801,205
[45] Apr. 2, 1974

[54] PROCESS AND DEVICE FOR THE SURVEY ALIGNMENT WITH A LASER BEAM

[75] Inventor: Eduard A. Eggenschwyler, Riggisberg, Switzerland

[73] Assignee: Pulfer AG, Bern, Switzerland

[22] Filed: Apr. 6, 1972

[21] Appl. No.: 241,859

Related U.S. Application Data
[63] Continuation of Ser. No. 11,316, Feb. 13, 1970, abandoned.

[52] U.S. Cl........ 356/138, 33/DIG. 21, 331/94.5 A, 356/172
[51] Int. Cl............................................. G01c 1/02
[58] Field of Search............... 356/138, 172; 33/1 T

[56] References Cited
UNITED STATES PATENTS

| | | | |
|---|---|---|---|
| 3,451,755 | 6/1969 | Silverman et al.............. | 350/162 SF |
| 730,016 | 6/1903 | Hein ..................................... | 33/297 |
| 3,599,336 | 8/1971 | Walsh .................................. | 33/293 |

FOREIGN PATENTS OR APPLICATIONS

| | | | |
|---|---|---|---|
| 1,045,730 | 10/1966 | Great Britain..................... | 356/199 |

OTHER PUBLICATIONS

Betz, H. D., "An Asymetry Method for High Precision Alignment with Laser Light," Vol. 8, No. 5, Applied Optics, May, 1969, pp. 1007–1013.
Herrmannsfeldt et al., "Precision Alignment Using a System of Large Rectangular Fresnel Lenses," Vol. 7, No. 6, Applied Optics, June, 1968, pp. 995–1005.
Jenkins & White, "Fundamentals of Optics," 3rd Ed., N.Y. McGraw Hill 1957, pp. 234–236.
Herriott, "Some Applications of Lasers to Interferometry," In Progress in Optics, Wolf Ed., Vol. 6, Chap. 5, p. 185, New York, John Wiley, 1967.

*Primary Examiner*—Ronald L. Wibert
*Assistant Examiner*—Steven K. Morrison
*Attorney, Agent, or Firm*—William J. Daniel

[57] ABSTRACT

A process and system for survey alignment along a straight line in which a columnated laser beam is projected along the line to be aligned from adjacent its starting point to a target plate at an end point thereon, the laser beam being diffracted intermediate such points, and preferably adjacent the starting point, by means of at least one set of two closely spaced parallel edges passing entirely through the beam at an angle, preferably perpendicular, to the beam axis, the spacing of the edges of such set being substantially less than the thickness of the beam. The result of the diffraction is a linear diffraction pattern of beam images tapering with increasing distance from the beam axis to eventually approximate a linelike thinness. The thin images at the opposite ends of this pattern define a straight line which passes through the beam axis independently of the position of the set of edges within the beam and thus locates the beam axis in one direction. Preferably two such sets of edges are provided, arranged in angular, preferably perpendicular, relation so as to locate the beam axis in two directions. The sets of edges may be constituted by a tensioned filament or a line inscribed on a transparent plate.

14 Claims, 4 Drawing Figures

PROCESS AND DEVICE FOR THE SURVEY ALIGNMENT WITH A LASER BEAM

This is a continuation, of Ser. No. 11,316, filed Feb. 13, 1970 now abandoned.

This invention relates to a process and device for the survey alignment with the use of a laser beam which is emitted from the starting point of a section of a line that is to be aligned in a predetermined direction and produces an image point defining the final point at the final point of the section of a line that is to be aligned as well as to a special application of said process.

Processes of the above mentioned kind have been known for some time and are used for example, in tunnel construction as well as for the solution of other survey projects mainly in the construction industry.

The sources of laser beams available at this time for such purposes are basically so-called gas lasers, because this variant of sources for laser beams can be produced most favorably with regard to cost and because the intensity of radiation of gas lasers, for example in contrast to ruby lasers, can be made low enough to exclude any danger to the individuals handling the laser beam source.

The low radiation intensity of the gas lasers, in principle, rests on a less sharp focusing of the light which however on its part, has for a consequence that the rays of the beam issued by a gas laser do not consist of light rays running precisely parallel, but that it has an opening angle in the order of magnitude of minutes of arc, for example of 3 minutes of arc.

In order to obtain an image point at a larger distance of for example 100 m, or 1 km. and a larger focal plane with such a laser beam source, usually a lens will precede the laser beam sources used for the processes mentioned earlier, with the help of which the light rays of which the laser beam consists are all brought into the same direction so that they will run parallel to one another.

However, it has turned out that the image points achievable thereby, or to put it more precisely, the possibly circularly illuminated plane which the laser beam produces at the end of the section of line which is to be aligned, do not define the center of the laser beam or the intersection point of the axis of the laser beam through the picture screen on which the illuminated plane is produced precisely enough for surveying where great precision is required.

For this reason, first of all the focal distance of the lens preceding the laser beam source has been made changeable, so that the laser beam can be focused at the end of the section of line that is to be aligned on said picture screen. In that way, one was able to be sure to achieve the desired precision, but this technique of the process was disadvantageous in that the lens or its focal distance had to be adjusted in each instance to the length of the stretch to be aligned.

This disadvantage has a particularly unfavorable effect in the case of construction of canals and ditches with a predetermined constant gradient or pitch, because in that case the laser beam source is firmly stationed and adjusted, and then the end point of the distance to be aligned is shifted only in dependence on the progress of the construction work or on the excavation of the canal, because then the focal distance of the lens preceding the laser beam source must be changed with every shifting of the end point, which among other things is also accompanied by the danger that with the exertion of force on the lens or the laser beam source which is required for an adjustment of the focal distance of the lens, the precise adjustment of the direction of the laser beam prior to shifting of the focal distance will be changed and thus will be made inexact. For that reason it was necessary in each instance to recheck once more after shifting of the focal distance of the lens, whether or not the direction of the laser beam or the direction of the axis of the beam source had changed.

Besides these complications in the execution of the known process mentioned initially, another effect also occurs which makes it difficult to define the exact position of the center of the laser beam at the end point of the stretch that is to be aligned or of the intersection point of the axis of the laser beam through the picture screen arranged at the end point of the stretch that is to be aligned, namely, a scattered light occurring around the actual picture point which probably develops through reflection from the suspended particles contained in the air. The distribution of this scattered light around the picture point is not even as a rule and moreover, the scattered light has not been sharply delimited to the outside either, so that the picture point appears merely as a spot of light of higher intensity within a plane illuminated by scattered light and does not necessarily have to be located in the center of this plane. One must take account of such scattered light effects particularly whenever many suspended particles are contained in the air, therefore for example as dust, and thus especially in the case of construction work.

The invention has for an object to find a process with the aid of which it would be possible to overcome the difficulties mentioned concerning the definition of the precise position of the center of the image point at the end of the stretch that is to be aligned.

According to the invention this will be achieved in the case of a process of the type mentioned initially in that parts of the laser beam are bent on an object inserted in the path of its rays with at least one edge running in a straight line through the laser beam and in that the diffraction picture or pattern developing at the end point of the stretch to be aligned because of this bending, is used for the definition of the position of the center of the image point.

The diffraction of the parts of the laser beam mentioned may in this case be made advantageously in the area of the starting point of the stretch that is to be aligned, preferably at the point of exit of the laser beam from the laser beam source.

In order to avoid the mentioned effect of the scattered light, in this case, the undiffracted part of the laser beam can be with particular advantage guided through a hole of a disk diaphragm serving as a picture screen at the end of the stretch to be aligned and can be conducted further on the rear side of the disk diaphragm and/or converted into heat so that no light energy of this undiffracted part of the laser beam can be reflected back through the hole from the rear to the front of the disk diaphragm whereby then the diffraction image alone, developing on the front of the disk diaphragm, is used for the definition of the position of the center of the laser beam in the plane of the disk diaphragm.

The invention furthermore relates to a device for carrying out the present process which is characterized by a laser beam source with an object attached at the place of exit of the laser beam from the laser beam source with at least one edge running in a straight line.

The object at the same time may effectively consist of a round wire stretched transversely in relation to the laser beam whose diameter is smaller than the diameter of the laser beam, or it can also consist of two round wires at right angles to each other and tensioned or stretched transversely in relation to the axis of the laser beam whose diameters are smaller than the diameter of the laser beam and preferably are of equal size in regard to one another.

Instead thereof, the object may also preferably consist of a transparent plate with one or two lines at right angles to one another whose thickness of line is smaller than the diameter of the laser beam.

In the case of a preferred embodiment of the device for carrying out the present process, a disk diaphragm has been provided as a picture screen for the image formation of the diffraction pattern where the diameter of the hole is larger than the diameter of the laser beam and which has been provided on its rear side with means to prevent a reflecting back of the part of the laser beam that has penetrated through the hole.

The invention furthermore relates in addition to the special application of the present process in canal and pipe line construction.

The invention has been explained in more detail on the basis of a number of embodiments.

In the case of an embodiment of the device to carry out the present process, the laser beam source consists of a gas laser which at the exit point of the laser beam has been provided with a lens which brings the individual light rays of the laser beam into the same direction so that they run in parallel to one another. The focal point of the superposed lens therefore lies at infinity. A sleeve placed in front on the lens is provided with two round wires at right angles to one another and stretched transversely in relation to the axis of the laser beam or is provided with a transparent plate which has two lines on the same side of the plate which are at right angles in relation to one another.

At the same time, the round wires have been disposed in such a way that the axis of the laser beam dissects the axes of the round wires and the diameter of the round wires amounts to about one fourth of the diameter of the laser beam. The two round wires standing at right angles in relation to one another touch at their point of intersection at the sides facing each other without however exerting any pressure on one another at the point of contact. The tension of the round wires amounts to about 30 mg/mm² and the round wires consist of heat treated steel wire, as used for example for the wires of a piano.

The device contemplates a structure in which the round wire is stretched transversely to the axis of the laser beam with the wire having a diameter smaller than a ray diameter of the laser beam. Also the diameter of the wire can be smaller than half the diameter of the laser beam and if desired two round wires can be arranged at right angles in relation to one another. Further, the diameters of the wires can be smaller than the diameter of the laser beam and are preferably equally large in relation to one another. Equally applicable, the round wires can be smaller than one-third of the diameter of the laser beam and are equally large as compared to each other. An object may consist of a transparent plate with a straight line having a thickness smaller than the diameter of the laser beam. The plate may be disposed so that the axis of the beam pierces the plane of the plate perpendicular to and intersects the line preferably on its axis.

The object may consist of a round wire or two round wires arranged at right angles to one another and the diameter of the wires may be smaller than the diameter of the laser beam with the diameters preferably equally large in relation to one another and also the round wires can be smaller than one-third of the diameter of the laser beam. The object may consist of a transparent plate with a straight line which is smaller than the laser beam and the plate is disposed in such a way that the axis of the beam pierces the plane of the plate. Also the thickness of the line may be smaller than one-half and preferably smaller than one-fourth of the diameter of the laser beam. The transparent plate having the two lines may be applied on the same side of the plate and the thickness of the two lines may be smaller than one-third to one-sixth of the diameter of the laser beam. A disk diaphragm may be provided as a picture screen for the image formation of the deflection pattern and the disk diaphragm on the rear side may be provided with a mirror which is disposed by a hole by which the part of the laser beam falls therethrough and is deflected. The disk diaphragm on the rear side may be provided with a black section disposed into that part with the laser beam, falls therethrough the hole in the disk diaphragm and in this way, radiation energy of the part of the laser beam following through the hole is converted into heat. The laser beam source may be set up above the stretch for laying pipe and at a predetermined distance from the bottom of the ditch that is to be excavated for the laying of the pipe. The device also contemplates the provision of the excavating depth of the excavator which may be adjusted by applying markings on the device bearing the buckets of the excavator. The laser beam source is set up as to the laying and re-laying of pipe at a place above the stretch where the laying takes place at a predetermined distance from the bottom of the ditch to be excavated. In such a situation, the laser beam is adjusted in the horizontal plane to an inclination corresponding to the prescribed drop of the pipe that is to be laid as well as to the direction of the ditch that is to be excavated. The adjustment of the excavating depth can be determined automatically and light intensity of the diffraction pattern or its differential change in a perpendicular direction is utilized in a controlling factor.

If instead of a sleeve with two stretched round wires, one uses a sleeve which has been provided with a transparent plate with two lines standing at right angles in relation to one another on one side of the plate then the transparent plate has been disposed in such a way that the axis of the laser beam runs through the intersection of the two lines and pierces the plane of the plate perpendicularly. The two lines effectively are arranged on the side of the plate facing away from the laser beam source. The production of these lines can be accomplished in the same manner as is known for example in the case of line screens which are used as diffracting screens, therefore for example, by engraving or etching into the transparent plate and lining of the engraved or etched courses with some black material. The thickness of the line may for example amount to one-fifth to onetenth of the diameter of the laser beam at the point of exit from the laser beam source.

The precise position of the intersecting point of the two lines or of the axes of the two round wires in relation to the axis of the laser beam has, in this case no decisive role as shall be explained in more detail in the following paragraphs, but the middle of the intersection point of the two lines may even be displaced somewhat in relation to the axis of the laser beam, and likewise the axes of one or both round wires can run past the axis of the laser beam at a certain distance. What is important is that at least one of the lines of each two lines or one side each of the two round wires passes through the laser beam.

The embodiment of the device for carrying out the present process as described comprises, furthermore, an orifice plate serving as a picture screen, which is erected at the end point of the stretch that is to be aligned while the laser beam source with the superposed lens and the sleeve put on said lens is disposed at the starting point of the section of the line that is to be aligned.

The disk diaphragm effectively consists of a plate, the front side of which facing the laser beam source serves as a picture screen for the diffraction pattern and which is provided with a hole, the diameter of which is larger than the diameter of the laser beam at the point of exit from the lens. On the rear side of the disk diaphragm behind the hole there is either a so-called black body or black hollow space in which the radiation energy of that part of the laser beam dropping or passing through the hole is converted to heat or else a mirror has been disposed behind the hole by means of which the part of the laser beam passing through the hole is diverted in such a way that it cannot again fall back through the hole. Effectively the reflection plane may be at an angle of 45° to the plane of the orifice plate, so that the part of the laser beam falling through the hole is deflected in a direction parallel to the orifice plate, whenever the orifice plate is disposed in such a way that the axis of the laser beam is perpendicular to the plane of the plate. The part of the laser beam reflected by the mirror and then running on for example, in a direction parallel to the plane of the orifice plate, can then be guided additionally in a black body or hollow space where its radiation energy is converted to heat. The latter however, is not absolutely required in the case of the use of a mirror attached behind the hole.

In order to be able to align a section of a line with the above described apparatus, the laser beam source with the lens attached to the exit point of the laser beam and the sleeve placed on said lens is set up at the starting point of the stretch that is to be aligned and is adjusted by means customary for this purpose in surveying technique to the desired direction in the horizontal plane and the desired inclination toward the horizontal so that the laser beam will start out in the predetermined direction from the laser beam source. Subsequently, the previously mentioned disk diaphragm is set up at the end of the section of the line to be aligned and to be sure in such a manner that the undiffracted part of the laser beam running along the axis of the laser beam falls through the hole in the disk diaphragm. Since the undiffracted part of the laser beam has the strongest light intensity, the hole must accordingly be brought within the area of the strongest light intensity. If the section of line which is to be aligned is very long, and if one therefore knows precisely where the laser beam runs and where one therefore is supposed to set up the disk diaphragm, then the laser beam can be made visible by whirling up some dust in the area where the laser beam will approximately be expected.

By the reflection of the light ray of the laser beam on the dust particles located in the path of the rays of the laser beam, the laser beam then becomes visible. But instead thereof, one can also first of all use a large focal plane which is set up in the area that is to be expected and on which the laser beam will then produce a central image point as well as the above mentioned diffraction pattern. Since the orifice plate has been set up so that now the undiffracted part of the laser beam falls through the hole in the orifice plate only the diffraction pattern will still be produced on the front side of the orifice plate facing the laser beam source. The above mentioned scattered light effect is lost because the hole of the orifice plate lies in the area of the strongest light intensity of the undiffracted part of the laser beam, and the undiffracted part of the laser beam therefore falls through this hole and is deflected on the backside of the disk diaphragm or the radiation energy of the undiffracted part of the laser beam on the rear side of the orifice plate is converted to heat. For the scattered light effect developed in the first place by the fact that a laser beam striking a screen is scattered on the place of incidence on the picture screen over a large angular dimension and a part of the scattered radiation illuminates the surroundings of the point of incidence. This effect normally occurs in the case of every projection of a spot of light on a focal plane, but in the case of the customary artificial sources of light it cannot be recognized in most cases with the naked eye because of the considerably lesser light intensity of these light sources in comparison to laser beam sources; nevertheless the same effect can be observed for example in the case of focusing of sunlight on one point by means of a lens.

The diffraction pattern developing on the front side of the disk diaphragm consists in principle of a number of spots of light which lie on two straight lines running in the plane of the front side of the disk diaphragm through the axis of the laser beam, and to be sure those spots of light which are produced by the diffracted laser beams on one of the round wires in the above mentioned sleeve or on the one line on the transparent plate in the above mentioned sleeve lie on one of those two straight lines and those spots of light which are produced by the diffracted laser beam on the other round wire or the other line lie on the other straight line. For the sake of a more detailed explanation, let one therefore, first assume that only a single round wire has been stretched in the sleeve or that only a single line was present on the transparent plate in the sleeve. Whenever this round wire or this line runs exactly perpendicular in relation to the axis of the laser beam then the straight line on which the spots of light lie which are produced by the part of the laser beam diffracted on the round wire or on the line lies precisely horizontal in relation to the axis of the laser beam, that is to say, therefore in a horizontal direction. Generally speaking, the angle between the above mentioned straight line and the projection of the round wire or the line onto the front side of the disk diaphragm is exactly 90°. If one now assumes that the laser beam runs in an exactly horizontal direction and that the projection of the round wire or of the line onto the front side of the disk diaphragm runs in an exactly perpendicular direction then the light rays of the laser beam striking the round wire or the line, or to state it more precisely, the edges which are formed by the round wire or the line are diffracted or bent on a horizontal plane. This results from the physical basis of light diffraction or from the Huygens-Fresnel principle. The spots of light produced by these diffracted light rays on the front side of the disk diaphragm must accordingly lie on a horizontal straight line, and to be sure, independently of whether the edges of the round wire or of the line have equal or different distances from the axis of the laser beam, or independently of whether the axis of the round wire or of the line intersects the axis of the laser beam or runs past it at a certain distance.

The spots of light on the straight line result in the known diffraction patterns of a first to an n-th order, whose light intensity decreases more and more with an increasing distance from the main axis of the source of radiation, that is to say, in the present case with an increasing distance from the axis of the laser beam or the center of the hole in the disk diaphragm.

The entire diffraction pattern for a single round wire for a single line will therefore be a chain of diffraction images which lies on a straight line running in the plane of the front side of the disk diaphragm and through the axis of the laser beam whereby on the two branches of the straight line which start out from the center of the laser beam and each time in the immediate vicinity of the hole lies the diffraction image of the first order, subsequently the diffraction image of the second order and subsequently the diffraction image of the third, fourth and so on, up to the $n$-th order. Since the light intensity of these diffraction images becomes less and less with an increasing distance from the center of the laser beam, the two parts of the chain which lie on the two above mentioned branches of the straight line become ever narrower in the direction toward the outside, that is to say therefore, with an increasing distance from the center of the laser beam and they finally taper off in a kind of a thin line.

If as in the case of the above described embodiment, instead of only one round wire or only one line, two round wires or lines, running at right angles to one another are used, then a pattern will develop as the diffraction pattern with two diffraction image chains standing at a right angle to one another or with four chain parts together forming a rectangular system or coordinates becoming ever narrower with an increasing distance from the center of the laser beam and tapering off finally each time to a thin line.

The front side of the disk diaphragm has been provided with markings which start out from the center of the hole and form a plane rectangular system of coordinates. If now the parts of the chain mentioned previously which taper off toward the outside in the form of thin lines, or these thin ends of said chain parts are brought precisely into agreement with the markings on the front side of the disk diaphragm then the axis of the laser beam pierces the hole in the disk diaphragm precisely in its center, and the position of the center of the hole in the disk diaphragm then defines the end point of the section of line that is to be exactly aligned.

Figure 2:
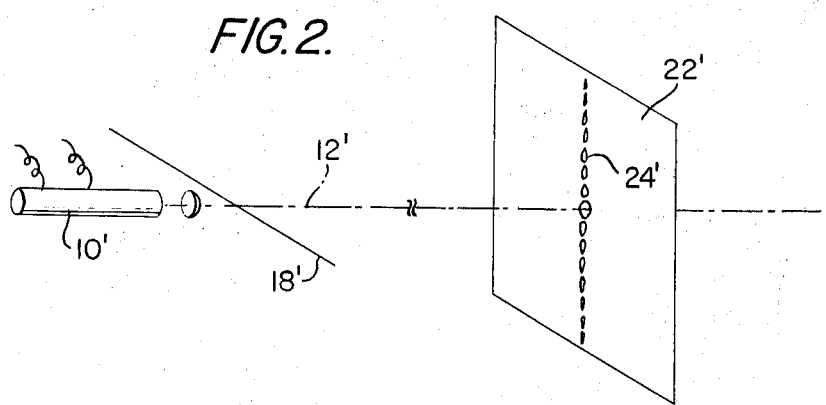
Figure 3:
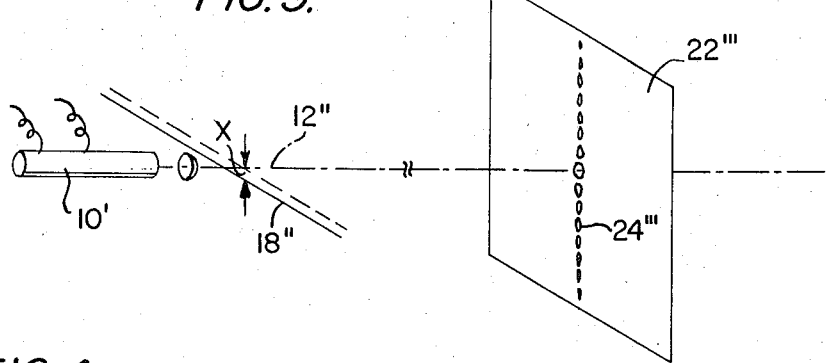
Figure 4:
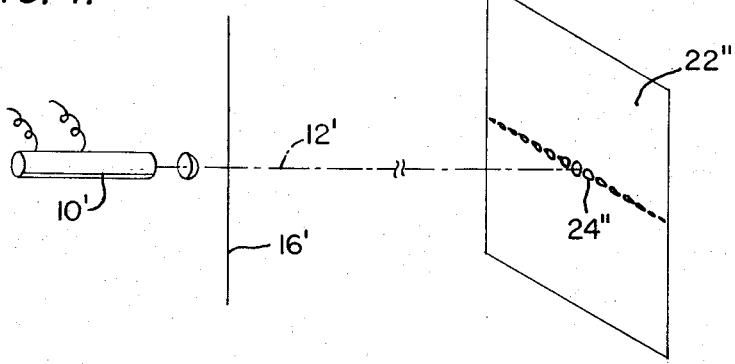

The aforegoing description may be more readily understood by reference to the accompanying drawings in which FIG. 1 is a more or less diagrammatic representation of a preferred arrangement according to the invention and FIGS. 2–4 are simplified schematic views illustrating the technical principles underlying the invention.

In FIG. 1, a laser beam source designated 10 emits a beam of laser radiation 12. Arranged in proximity to the laser beam source is a collimating lens 14 which focuses the radiation beam into a generally coherent column indicated in dot-dashed lines. Downstream of the lens 14 the rectilinear diffraction element is interposed into the beam which in this preferred embodiment takes the form of two crossed elements 16 and 18, respectively, mounted in an annular supporting frame 20. At appropriate downstream target point to be aligned is a disc diaphragm or target plate 22 which serves as a picture screen for the diffraction pattern created as a consequence of the diffraction of the laser beam by the elements 16 and 18, such pattern being designated 24. It is desirable that the image of the main body of the laser beam on the disc diaphragm or target plate be eliminated in order to maximize the contrast of the diffraction pattern to the eye of the observer. To this end, the diaphragm or plate 22 is formed with a central aperture 26 of a size sufficient to permit passage therethrough of the main body of the beam and means are provided downstream of this aperture for absorbing the main beam body. Such means can take the form of a black cone indicated schematically at 28 immediately behind and in registration with the opening 26.

FIGS. 2 and 4 illustrate the working principle of the invention using a single diffracting element alone. Here, the element 18' is arranged generally horizontally within the path of the beam designated 12' as emitted from the source 10'. The diffraction pattern 24' at the diaphragm or plate 22' has an orthogonal relationship to the direction of the element 18' and thus extends vertically. Conversely, in FIG. 4, the arrangement of the element 16' vertically within the path of the beam 12' produces a horizontal diffraction pattern 24''.

An important feature of the invention is illustrated in FIG. 3, namely, the ability of the system of the invention to tolerate deviations of the diffraction element from the precise axis of the laser beam without altering the effectiveness of the diffraction pattern for indicating the precise axis of the beam. Thus, in FIG. 3, the element 18'' is displaced a distance X below the actual beam 12''. Nevertheless, the diffraction pattern 24''' passes precisely through the intersection of the axis 12'' with the diaphragm or plate 22''' as a consequence of the orthogonal relationship of the diffraction pattern with its corresponding rectilinear diffracting element. It will, of course, be appreciated that the diffracting element cannot be displaced entirely outside the lateral confines of the laser beam body.

A particularly advantageous use of the present process results in canal and ditch construction for there nowadays maintaining precision is required, which implies a quite considerable geodetic operational effort and also a repeated reworking in the case of excavating the ditch or in the case of leveling the lining of the ditch bed to the prescribed height. These high requirements for precision are conditioned essentially because of the fact that as a rule only a few meters of drop have been provided for relatively considerable distances or stretches and because in addition it has been prescribed that the drop is to be constant over the entire stretch. In this respect considerable advantages and simplifications will be achieved with the present process by setting up the laser beam source in the case of relaying of pipes at one point above the relay stretch at a certain distance from the bottom of the ditch that is to be excavated for the relaying of pipes and that the laser beam is adjusted in the horizontal plane to a grade according to the prescribed drop of the pipe that is to be laid, as well as to the direction of the ditch that is to be excavated. Then the excavating depth of the excavator excavating the ditch can be adjusted by attaching a marking on the device carrying the buckets of the excavator at a perpendicular distance from the bottom apex of the line of movement of the bucket which is equal to the above mentioned distance of the laser beam source from the bottom of the ditch on which marking the center defined by the diffraction pattern will fall in the case of the correct adjustment of the depth of excavation. This adjustment can also be accomplished automatically whereby as a control criterion one can use the light intensity of the diffraction pattern or its differential change in a perpendicular direction. Subsequently after excavation of the ditch and in the case of a laying of the pipes the pipe bottom can then be surveyed precisely in accordance with the process described in detail further above with the aid of a disk diaphragm whereby the laser beam source is left unchanged in its position and the disk diaphragm is placed on the bottom of the pipe embedded in the excavated ditch each time by means of a rod. In this case the rod must be long enough that the perpendicular distance of the center of the orifice plate from the bottom of the pipe is equal to the prescribed distance of the laser beam source from the bottom of the pipe, which is somewhat smaller than the above mentioned distance of the laser beam source from the bottom of the ditch.

I claim:

1. In a process for survey alignment along a straight line in which a columnar beam of laser radiation is projected from adjacent the starting point of said line along its length to produce an image at an end point thereon, the improvement comprising projecting said laser beam across at least one set of two parallel straight edges spaced apart less than the beam thickness and passing through said beam at an angle to the beam axis, thereby producing by diffraction a linear diffraction pattern of images of said beam at said end point extending on either side of said beam with the outer images of said pattern tapering to eventually approximate a line-like thinness, said thin outer images defining the ends of a straight line which passes through the axis of the laser beam independently of the position relative to the beam axis of said set of edges in said beam and thus defines the position of the beam axis in one direction, whereby said end point can be aligned relative to the beam position thus defined.

2. The process of claim 1 wherein said laser beam is projected across two such sets of straight edges which sets pass through the beam in angular relation to one another, thereby producing plural diffraction patterns of such images, the respective outer images of said patterns defining plural straight lines passing through the beam axis and intersecting at such axis to define the position thereof in two directions.

3. The process of claim 2 wherein said two sets of edges pass through said beam in substantially perpendicular relation to one another.

4. The process of claim 1 wherein said sets of straight edges is constituted by a thin rectilinear element having a thickness substantially less than the thickness of said beam.

5. The process of claim 1 wherein said set of edges passes through said beam at an angle perpendicular to the beam axis.

6. The process of claim 1 wherein a thin rectilinear element passes through said beam, the opposite edges of said element constituting said set of edges.

7. The process of claim 6 wherein said rectilinear element is a line or filament.

8. In a system for survey alignment along a straight line including means for projecting a columnar beam of laser radiation from adjacent the starting point of said line along its length to its end point, means adjacent said beam projecting means for diffracting said beam into a diffraction image pattern, and target means at said end point for receiving and visibly displaying said diffraction image pattern, the improvement wherein said beam diffracting means comprises at least one thin rectilinear element passing through said beam at an angle to the beam axis, said element having a thickness not greater than about one-third the beam thickness, whereby said diffraction pattern is a linear chain of images tapering to eventually approximate a line-like thinness, the thin outer images defining the ends of a straight line extending through the beam axis and thus locating the beam axis in one direction for relative alignment of said line.

9. The system of claim 8 wherein said rectilinear element is an opaque filament stretched transversely through the beam.

10. The system of claim 8 wherein said rectilinear element is a straight line inscribed on a transparent support.

11. The system of claim 8 wherein two distinct rectilinear elements are passed through said beam in angular relation to one another, thereby producing plural diffraction patterns which locate the beam axis in plural directions.

12. The system of claim 8 wherein said target means includes an opening thereon registering with the beam axis and larger in size than the beam for passage of the beam itself therethrough and means on the remote side of said opening for preventing the reflection of the beam towards said opening.

13. The system of claim 12 including beyond said target opening a mirror for deflecting said beam away from said opening.

14. The system of claim 12 including radiation absorbing means receiving said beam after passage through said opening.

* * * * *

UNITED STATES PATENT OFFICE
CERTIFICATE OF CORRECTION

Patent No. 3,801,205      Dated April 2, 1974

Inventor(s) Eduard A. EGGENSCHWYLER

It is certified that error appears in the above-identified patent and that said Letters Patent are hereby corrected as shown below:

In the Heading of the Patent, insert the following:

-- [30]    Foreign Application Priority Data

Feb. 14, 1969     Switzerland    2239/69    --.

Signed and sealed this 6th day of August 1974.

(SEAL)
Attest:

McCOY M. GIBSON, JR.        C. MARSHALL DANN
Attesting Officer             Commissioner of Patents